July 11, 1939.    W. HÖHNDORF    2,165,894
TESTING INSTRUMENT FOR VEHICLES
Filed April 6, 1937
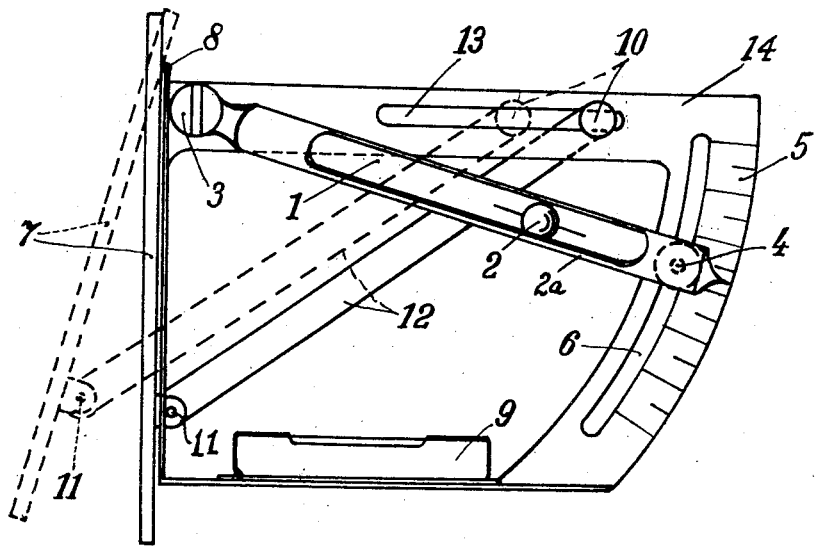
Inventor:
Wilhelm Höhndorf
Strauch & Hoffman
Attorneys Patented July 11, 1939

2,165,894

UNITED STATES PATENT OFFICE 2,165,894

TESTING INSTRUMENT FOR VEHICLES

Wilhelm Höhndorf, Hanover-Waldheim, Germany

Application April 6, 1937, Serial No. 135,343
In Germany March 2, 1937

4 Claims. (Cl. 264—1)

The present invention relates to an instrument of a device for ascertaining the efficiency of the brakes of a vehicle by testing the retardation of a vehicle's movement during the period of braking, or for ascertaining the acceleration during running. The new instrument or device is adapted for use on motor cars or the like, and is characterized principally by a ball, preferably consisting of steel, movably arranged in an inclined tube, in such a manner, that the movement of said ball along said tube due to its kinetic energy serves as a measure for the retardation or acceleration of the vehicle's movement during the braking period or during the acceleration of the vehicle respectively.

The ball preferably is arranged in a tube, the longitudinal axis of which extends in the same direction as the longitudinal axis of the vehicle to be tested, and is inclined to the horizontal. Preferably the tube may be adjusted to vary its inclination and fixed in an adjusted position in front of a scale.

Further essential features of the invention are stated in the following specification and the claims. In testing instruments according to the invention, the inclination of the tube determines the inclination of the path traversed by the ball and thus measures the retardation of the vehicle's movement during the braking period or the acceleration in operation.

The advantages of the new instrument consist in simplicity of construction, a high degree of exactness, low price of manufacture, elimination of the problem of spring fatigues and the like and of other faults as well as providing an instrument wherein a prescribed retardation during the braking period may be determined in advance by varying the inclination of the tube and then be ascertained by the movement of the ball beyond an opaque casing (not shown) or the like, surrounding part of the tube so that its free end terminates at a point along the tube which is reached by the ball at the minimum value of retardation.

In the accompanying drawing one construction according to the invention is shown by way of example in side elevation.

A glass tube 1 carrying a movable steel ball 2 is arranged in an arm 2a pivotally mounted in the bearing 3 provided in a frame 14. Arm 2a may be fixed in any desired inclined position in front of a scale 5 of the frame 14 by means of a clamp screw 4 passing through a curved slot 6 also provided in the frame 14.

Before starting the testing of the brakes of a vehicle, the supporting plate 7 of the instrument is pivotally connected at 8 to the frame 14 and is fixed to a wall of the vehicle by means of screws, rubber suction cups or the like not shown in the drawing, in such a manner, that the longitudinal axes of the vehicle and of the glass tube 1 extend in the same direction. Then the swingable frame is levelled, by means of a water level 9 fixed to the frame 14, adjustment being permitted by the pivot 8. A clamp screw 10 on a lever 12 passing through a straight-lined slot 13 provided in the frame 14 at an angle of about 90° to the scale 5 serves to fix frame 14 in adjusted position. The other end of the lever 12 is linked at 11 to the supporting plate 7. When the brakes of the vehicle are applied the ball 2 moves along the inclined tube only if a predetermined deceleration rate has been attained. The preset inclination of tube 1 determines the actual value of deceleration for which the device is operative.

The instrument may be used for ascertaining the retardation of the vehicle during the braking period and the acceleration during running respectively, by reversely arranging the tube, that is to say, by so arranging the parts that the connecting plate points rearwardly in the direction of travel.

The tube 1 preferably contains a damping liquid, air or another damping medium.

If the instrument is used only to ascertain one or several average retardations of the vehicle's movement during the braking period, for instance the retardation of 2.5 m./sec.$^2$ or 32.8 ft./sec.$^2$ prescribed for the foot brake and the retardation of 1.5 m./sec.$^2$ or 19.7 ft./sec.$^2$ prescribed for the hand brake, then, instead of providing a scale, the lower end of the tube may be surrounded by an opaque casing for such a length, that any appearance of the ball above this casing indicates, that the brakes are in order. Preferably the slot provided for the adjustment of the tube in such a structure has such dimensions only, that when the tube occupies the lower position in the slot, the appearance of the ball beyond the casing of the tube corresponds to a retardation of 2.5 m./sec.$^2$ or 32.8 ft./sec.$^2$, whereas, when the tube is adjusted into the upper position, the appearance of the ball beyond the casing corresponds to a retardation of 1.5 m./sec.$^2$ or 19.7 ft./sec.$^2$.

If the instrument is fixed to the dash-board of a motor car, a lamp may be provided to illuminate the instrument, so that it may also be read off in the dark.

What I claim is:

1. In an instrument as set forth, a supporting plate, adapted to be fixed to a portion of a vehicle, a frame adjustably connected to said plate having a straight-lined slot, a link pivoted to said supporting plate, a screw carried by said link passing through said slot in said frame, a tube pivoted to said frame and adapted to be adjusted in a plane parallel to the direction of drive of the vehicle, a ball movably arranged in said tube for movement therealong to indicate deceleration or acceleration, means for fixing said tube in an adjusted position, and means for controlling the inclination of said tube.

2. In an instrument as set forth, a supporting plate adapted to be fixed to a portion of a vehicle, a frame linked to said supporting plate having a straight-lined slot and a curved slot extending at an angle of about 90° to said straight-lined slot, a link pivoted to said supporting plate, a screw carried by the free end of said link engaging said straight-lined slot, a tube pivoted to said frame, a ball freely movable arranged in said tube for movement therealong to indicate deceleration or acceleration, and a screw carried by the free end of said tube extending through said curved slot and serving to fix said tube in an adjusted position.

3. In an instrument as set forth, a supporting plate adapted to be fixed to a portion of a vehicle, a frame linked to said supporting plate having a straight-lined slot and a curved slot extending under an angle of about 90° to said straight-lined slot, a scale provided adjacent to said curved slot on said frame, a tube pivoted to said frame and adapted to be adjusted in a plane parallel to the direction of drive of a vehicle, said tube containing a damping medium, a ball freely movable in said tube for movement therealong to indicate deceleration or acceleration, a screw at the free end of said tube engaging said curved slot and adapted to fix said tube in a predetermined position, and a water level connected to said frame.

4. An instrument for measuring acceleration or deceleration comprising a support adapted to be secured to a rigid portion of a vehicle or the like, a frame pivotally adjustably mounted upon said support and means for locking said frame in a desired position of adjustment upon said support, a tube containing an inertia member pivotally mounted upon said frame and adapted to be adjusted to an inclined position in a plane parallel to the direction of drive of the vehicle, means for indicating the degree of adjustment of said tube and means for locking said tube at a predetermined position of adjustment and level indicating means mounted on said frame.

W. HÖHNDORF.